United States Patent [19]

Brown et al.

[11] 3,968,279

[45] July 6, 1976

[54] METHOD FOR APPLYING PLASTISOL COATING OF UNIFORM THICKNESS TO GLASS CONTAINERS

[75] Inventors: William Brown, Amanda; Francis J. Shonebarger, Lancaster, both of Ohio

[73] Assignee: Anchor Hocking Corporation, Lancaster, Ohio

[22] Filed: Sept. 19, 1974

[21] Appl. No.: 507,358

Related U.S. Application Data

[62] Division of Ser. No. 408,617, Oct. 23, 1973, Pat. No. 3,870,015.

[52] U.S. Cl. ............................. 427/348; 427/384; 427/430
[51] Int. Cl.² .................................. B05D 3/04
[58] Field of Search ............... 427/348, 430, 384; 118/63; 65/60

[56] References Cited
UNITED STATES PATENTS

| | | | |
|---|---|---|---|
| 1,799,760 | 4/1931 | Moon | 118/63 |
| 2,262,045 | 11/1941 | Pollitt | 427/348 X |
| 2,269,592 | 1/1942 | McGraw | 118/63 |
| 2,988,459 | 6/1961 | Buelow et al. | 427/348 |
| 3,200,002 | 8/1965 | Lusher | 427/430 X |
| 3,253,943 | 5/1966 | Mayer et al. | 118/423 X |
| 3,341,353 | 9/1967 | Johnson | 427/430 X |
| 3,707,400 | 12/1972 | Harvey et al. | 427/349 |
| 3,736,174 | 5/1973 | Moyer | 118/63 X |

*Primary Examiner*—Michael R. Lusignan
*Assistant Examiner*—Stuart D. Frenkol
*Attorney, Agent, or Firm*—Wood, Herron & Evans

[57] ABSTRACT

An apparatus and method are described for coating a glass container with a substantially uniform thickness of a viscous curable plastic coating material. The article being coated is first dipped into a bath of the plastic coating material while gripped at the finish or closure portion, and is drawn upwardly through an air knife apparatus in accordance with the invention, which provides a shaped air flow that removes the excess coating material from the surface of the article, and leaves a coating of uniform thickness thereon. The coating is then cured to a hardened state.

4 Claims, 9 Drawing Figures

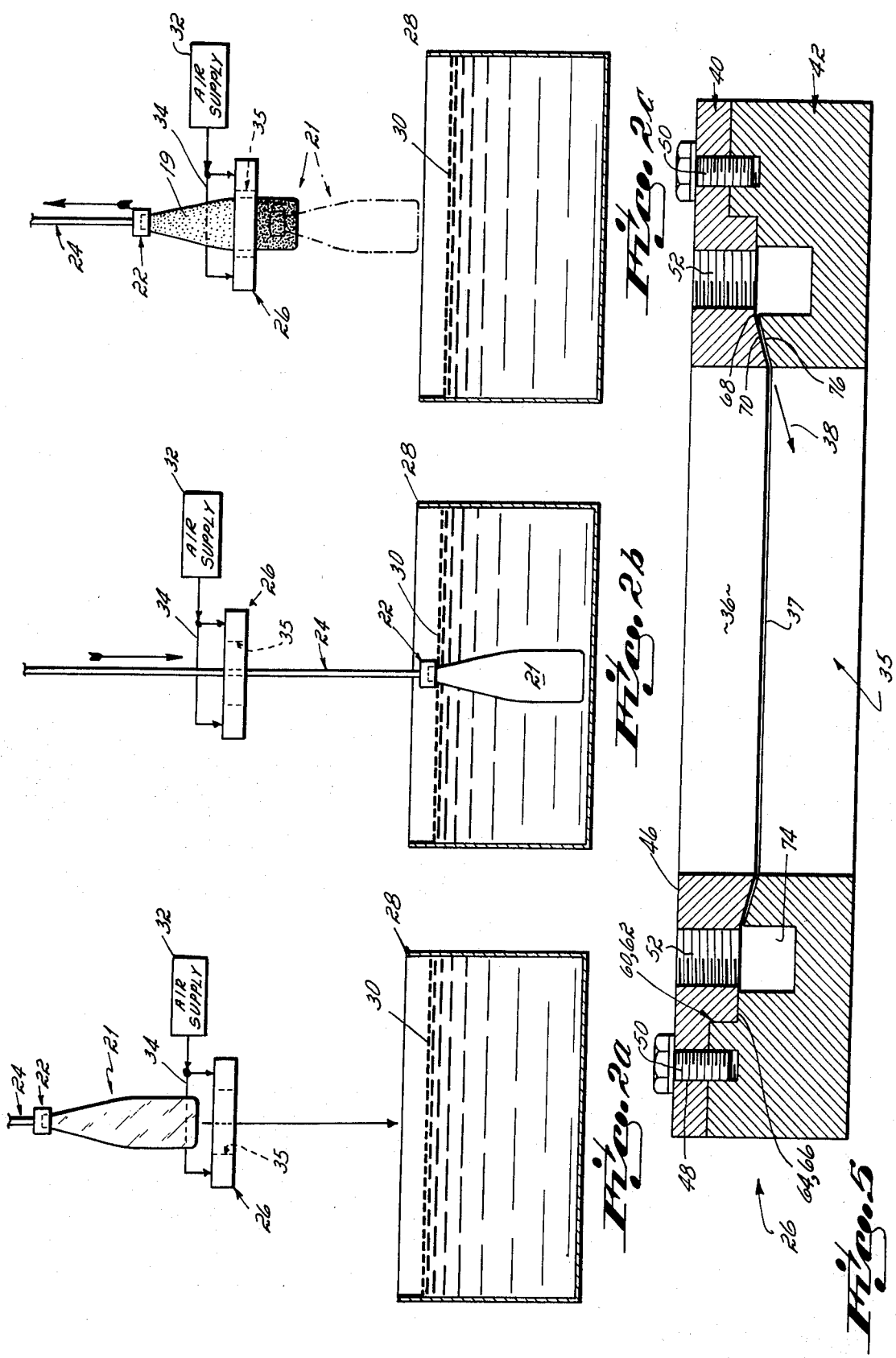

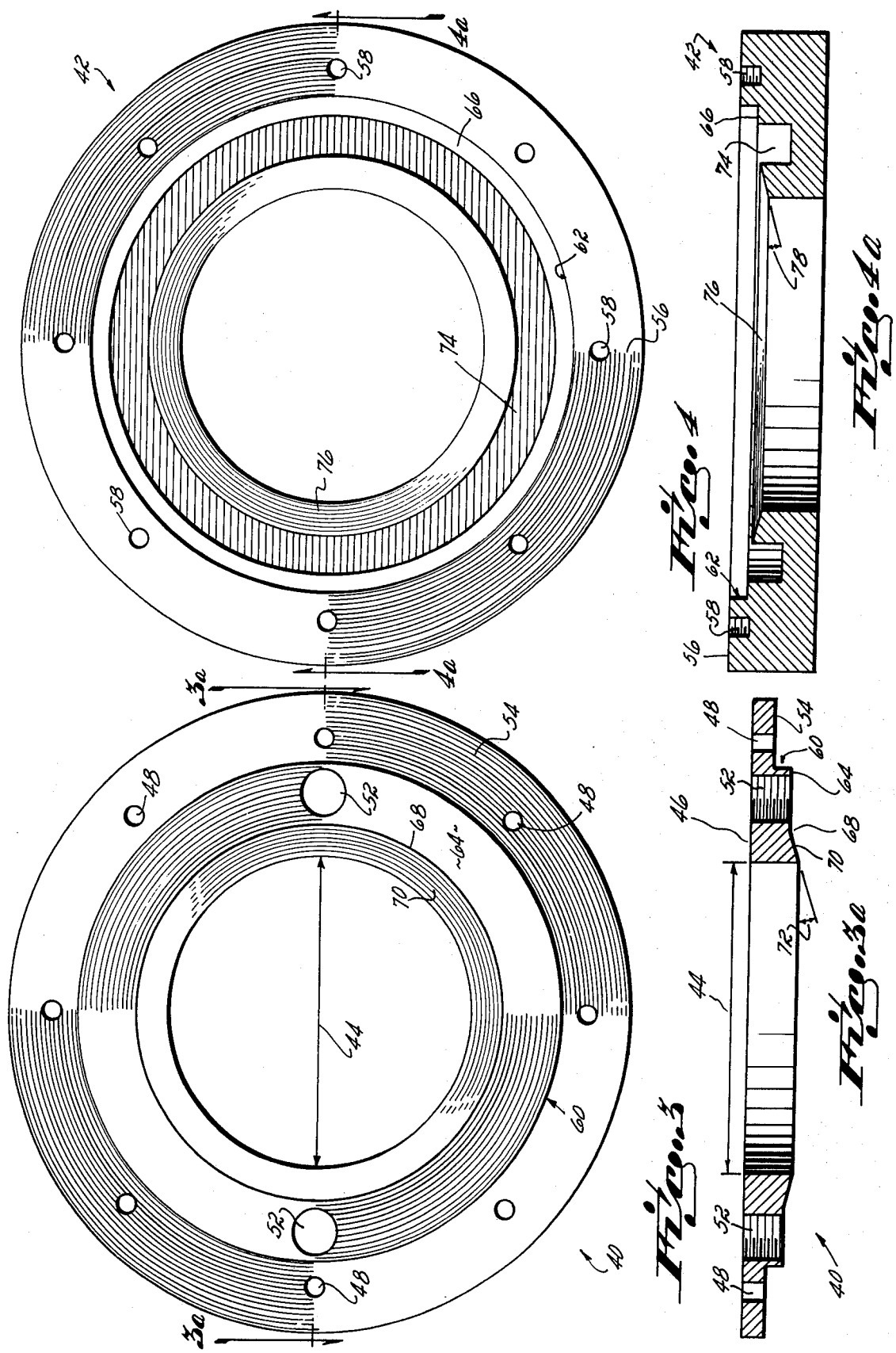

METHOD FOR APPLYING PLASTISOL COATING OF UNIFORM THICKNESS TO GLASS CONTAINERS

This is a division of application Ser. No. 408,617, filed Oct. 23, 1973, now U.S. Pat. No. 3,870,015.

BACKGROUND OF THE INVENTION

This invention relates to the field of coating articles and more particularly to applying a uniform coating of a viscous plastic material such as a plastisol on glass containers.

It is known in the art to apply a plastic coating to glass containers in order to reduce the danger of abrasion of the glass and the chance of shattering and fragmentation. The plastic may be applied as a plastisol, that is, a colloidal dispersion of a synthetic resin in a plasticizer, with or without solvent, in the form of a viscous liquid. The article is dipped into a bath of the plastisol and the excess is allowed to drain. The plastisol is then hardened or cured, usually by heating.

When tall objects, such as beverage bottles, are dipped into a plastisol bath, the liquid drains downwardly on the bottle from the top toward the heel or base. That amount which is grossly excessive will drain off, but the layer that remains on the bottle tends to be thicker near the heel than at the top. As a result, the final cured coating will display a thickness at the lower part of the sidewall which is substantially thicker than at the top, and it may even be several times thicker than the top. This results in higher material coats, without commensurate improvement in protection for the glass article. Such nonuniform thicknesses do not cure uniformly, and a cure cycle which is appropriate for a median thickness may over- or under-cure coatings which are too thin or too thick.

Moreover, gravity drain of excess plastisol after the bottle has been dipped into it requires an undesirably long time. A period of 90 minutes or more after dipping may be required before coating drains by gravity to a desired nominal or mean thickness of said 3 mils. This slows rate of production, or (if the excess is not allowed to drain before curing) results in a coating which is unnecessarily heavy, improperly cured, and which increases coating material costs.

Coating uniformity can be improved by inverting the article after dipping, so that an excess accumulation of coating near the heel will flow toward the finish. However, such inversion is mechanically difficult at useful line speeds, and is very sensitive to timing, temperature and viscosity.

One prior art approach for eliminating the excess material which accumulates on the lowermost surfaces of a previously dipped article has been to contact these lower surfaces with an absorbent roller wetted with a liquid solvent. This approach does remove excessive material, however, it does not assure that the remaining coating is uniform in thickness.

OBJECTIVES OF THE INVENTION

In view of the foregoing difficulties experienced in prior art approaches for coating glass bottles with a plastic coating, it is a primary objective of this invention to provide a method and apparatus for coating glass containers such as narrow neck bottles and wide mouth jars with a substantially uniform coating of plastisol material, and further wherein the time and handling required is less than previously required by other methods and apparatus.

SUMMARY OF THE INVENTION

In accordance with this invention, the glass container which is to be coated is dipped into a bath of liquid plastisol material so that the area to be coated is wetted with the material. The liquid coated article is withdrawn from the liquid bath. Some gravity draining of excess coating material occurs as the article is raised. The article is drawn upwardly through a fixture of a form to be described, out of which an air jet or "air knife" is directed radially inwardly towards the article passing therethrough, and at a downward angulation, so as to define a thin conical sheet of air, moving toward an apex point. This jet of air is operative to remove the excess liquid plastisol material from the surface of the container and substantially uniformly to distribute the remaining material over the container surface. Once the container has been drawn through the air knife fixture, it may then be cured in conventional manner, for example in an oven at elevated temperature, so that the liquid plastisol material is converted to a solid plastic coating on the container.

More particularly, the air knife fixture comprises a ring through which the liquid coated article is drawn while being gripped by a chuck or clamp at the finish or closure portion thereof. An annular plenum chamber inside the ring communicates with an annular orifice located on the inner surface of the ring. A pressurized air supply communicates with the plenum chamber so that air will flow uniformly from the annular orifice towards the article passing through the ring. The annular orifice itself communicates with the plenum chamber in a manner so that the air passing through the orifice is angled downwardly to form a thin conical sheet of moving air directed toward an apex point disposed downwardly of the orifice. The optimum downward angulation of the thin conical sheet of air is less than 45° and greater than 0° to the horizontal. In one preferred embodiment, the downward angulation of the conical sheet of air is approximately 15°.

The foregoing and other objects, advantages and features of this invention will become more clear from the following detailed description of the preferred embodiment therefor taken in connection with the drawings.

DESCRIPTION OF THE DRAWINGS

FIGS. 2a, 2b and 2c are a sequence of elevations showing schematically three steps in the coating of glass bottles of the types shown in FIG. 1 with a liquid plastisol material, in accordance with the invention.

FIG. 3 is a plan view from below of the upper half of the air knife fixture of this invention.

FIG. 3a is a vertical sectional view taken along section line 3a–3a of FIG. 3.

FIG. 4 is a plan view from above of the mating lower half of the air knife fixture of this invention.

FIG. 4a is a vertical sectional view taken along line 4a–4a of FIG. 4.

FIG. 5 is a vertical sectional view of the assembled air knife fixture, showing the two halves thereof disposed in their interfitting positions.

DETAILED DESCRIPTION

Figure 1:
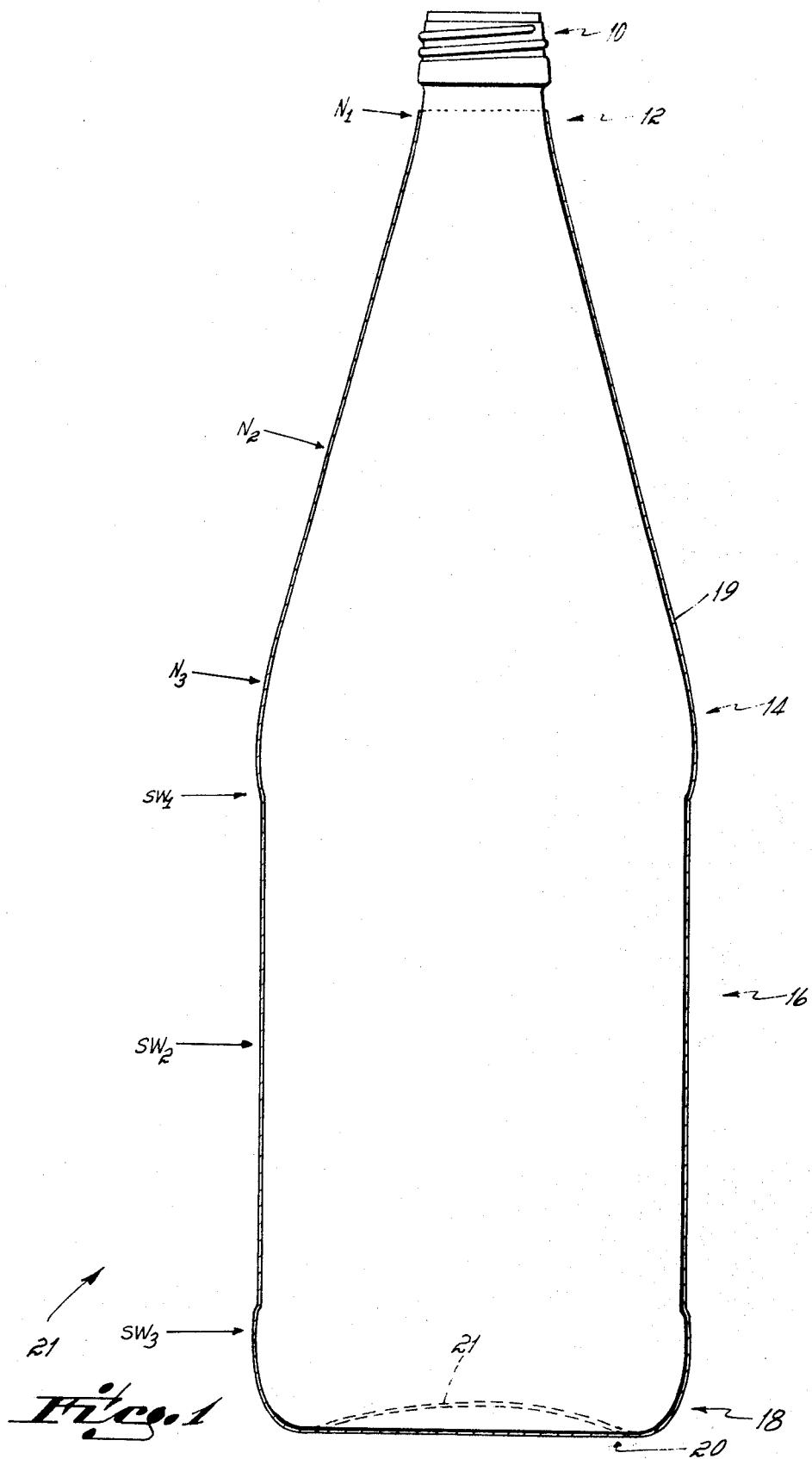
FIG. 1 is a side elevation of a typical carbonated beverage container made of glass.

Referring now to FIG. 1, a glass container in the form of a typical carbonated beverage bottle is shown with a finish 10 at the top, which comprises the threaded or ribbed portion for engaging and holding a cap or other closure. Extending downwardly from the finish 10 is a relatively narrow neck portion 12 which flares outwardly with a gradually increasing circumference below the finish 10. The bottle has a so-called shoulder, generally at 14, which forms a transition region between the neck 12 and the side wall shown generally at 16. At the lower end of the side wall 16 is a heel portion 18 which presents a rounded corner surface between the side wall 16 and the bottom 20 of the bottle. The bottom 20 is "domed" or recessed at the center, as indicated by the dotted line at 21.

According to this invention, glass articles including (by way of illustration and not limitation) bottles of the type shown in FIG. 1, are coated with a plastisol by the process generally shown in FIGS. 2a, 2b and 2c. This plastisol coating is shown as a thin coating over the bottle shown in FIG. 1.

In FIG. 2a, a bottle 21 of the type generally shown in FIG. 1 is gripped at the finish 10 by a bottle gripping apparatus or chuck shown generally at 22. Chucks for this purpose are known in the art and do not comprise the invention. The chuck need only grip the bottle finish to thereby support the bottle for movement in the manner described below.

The chuck 22 is mounted on the lowermost end of a chuck support member 24 which is movable generally in a vertical direction to permit the bottle 21 to be raised and lowered between the positions shown in FIG. 2a and FIG. 2b.

Located directly below the bottle 21 is an air knife fixture 26 according to this invention. The air knife fixture generally is in the shape of a ring with a central opening located directly beneath the bottle 21 thereby permitting the bottle to be lowered vertically by the movable chuck support member 24 through the air knife fixture 26 into the liquid plastic material contained in the tank 28, as shown in FIG. 2b. The liquid plastic material 30 in the tank 28 preferably comprises a liquid plastisol material which will wet to the surface of the bottle 21. Numerous plastisols are available, however, one particularly useful type is known as No. 2342 manufactured by the G & S Plastic Company. While this particular plastisol material has been used successfully, other plastisols which cure at elevated temperatures are also usable to form a uniform hardened plastic coating for bottles according to the invention.

As shown in FIG. 2c, after the bottle 21 has been wetted in the liquid 30 for a short period of time and preferably about 3 seconds the bottle 21, in substantially upright position, is raised upwardly by the chuck support member 24 through the air knife fixture 26. According to this invention, the air knife fixture 26 is connected to a pressurized air supply 32 by air tubing 34. The flow of air through an annular orifice in the air knife fixture 26, as will become more clear later, forms a thin conical sheet of air directed downwardly and inwardly toward the bottle 21. The bottle is raised upwardly through the air knife, the longitudinal axis of the bottle being substantially vertical and parallel to the central axis of the conical sheet of air, as shown in FIGS. 2c and 5. This thin conically shaped sheet of air is operative to remove excess liquid plastic material from the surface of the bottle and leave a substantially uniformly thick residue of liquid material on the surface after the bottle has passed through the air knife fixture 26. The bottle is then moved into an oven to cure the plastic material. The actual curing process required depends entirely on the specific coating material used, however, in one preferred form of the invention, No. 2342 plastisol is used with a curing temperature of approximately 460° to 500° F. and a curing time is approximately 6 to 6½ minutes.

Referring to FIG. 5, the air knife fixture 26 in its preferred form is shown in section. As indicated generally above, the air knife fixture 26 is formed in the shape of a ring with a central circular opening, shown generally at 35, through which a bottle or other article being coated is drawn. The central opening 35 has a substantially cylindrical shaped wall 36 in which an annular orifice 37 is provided. This annular orifice 27, in its preferred form, comprises an opening in the wall 36 which is approximately 5 mils high. Additionally, as will become more clear later, the annular orifice communicates with a pressurized air supply and is shaped to form a thin conical sheet of moving air which is angled downwardly in a direction shown generally by the arrow 38. This downward angulation of the air flow is operative to remove excess plastisol material from the surface of a bottle drawn upwardly therethrough and also to uniformly distribute the residue remaining on the surface of the bottle.

The air knife fixture of this invention is preferably formed in two halves. The upper half 40, in one preferred form, is shown in FIGS. 3 and 3a. The lower half 42 is shown in FIGS. 4 and 4a. Both the upper and the lower half 40 and 42 of the air knife fixture are preferably made of a metallic material such as aluminum or other material easily machined to close tolerances and are shaped, as described below, to interfit in the manner shown in FIG. 5.

The upper half 40 of the air knife fixture is generally ring shaped and includes a centrally located cylindrically shaped passageway therethrough having a diameter indicated at 44. In its preferred form, the diameter 44 is approximately one inch larger than the maximum diameter of bottles which are moved upwardly through the air knife fixture. The upper half 40 includes an upper surface 46 which comprises a substantially planar surface with a plurality of uniformly distributed holes 48 passing perpendicularly therethrough. These holes 48, provide a passageway for threaded screws 50 (as shown in FIG. 5), which secure the upper half 40 to the lower half 42 of the air knife fixture. Two threaded holes 52 also pass perpendicularly through the upper half 40. These threaded holes 52 are aligned, as will be described later, with their axia arranged perpendicularly to the upper surface 46 and are threaded to receive threaded air tubes through which pressurized air is admitted to the air knife fixture.

The lower surface of the upper half 40, as best shown in FIG. 3a, is shaped to interfit with the lower half 42 of the air knife fixture. Disposed nearest the circumference of the upper half 40 is an annular shaped surface 54 which when the upper half 40 is interfitted with the lower half 42, as shown in FIG. 5, rests on an annular shaped surface 56 of the lower half 42. The surface 56 includes a plurality of equally spaced threaded holes 58 which are located in alignment with the holes 48 of the upper half 40 so as to permit bolts 50, as viewed in FIG.

5, to pass through the upper half 40 and engage the threaded holes 58 in the lower half 42 thereby securing the two halves of the air knife fixture together in their interfitting position.

The lower surface of the upper half 40 (FIG. 3a) additionally includes a downwardly projecting cylindrical wall 60 which has a diameter just small enough to interfit with the cylindrical wall 62 (FIG. 4a) located on the upper surface of the lower half 42.

Referring again to FIG. 3a, extending inwardly of the lowermost portion of the cylindrical wall 60 is a flat annular surface shown generally as 64 through which the threaded holes 52 pass. As viewed in FIG. 4a, the half 42 includes an annular support surface 66 disposed inwardly of the cylindrical wall 62 on which the outermost portions of the surface 64 of the upper half 40 rests when the two halves are in their interfitting position. The flat surface 64 extends inwardly of the cylindrical wall 60 to a line shown generally at 68 from which a downwardly sloped inwardly projecting surface 70 extends. This surface 70 is angled downwardly as indicated by the angle 72 and defines the upper wall for the annular orifice 37. As has already has been indicated, in its preferred form the angle 72 is approximately 15° although the angle may take on other values depending on numerous system variables discussed later.

Referring again to FIG. 4a, an annular slot or chamber 74 is cut downwardly into the support surface 66. This annular slot 74, when the two halves of the air knife are in their interfitting position, as shown in FIG. 5, comprises an annular plenum chamber for receiving pressurized air.

Disposed inwardly of the annular slot 74 is a downwardly sloping surface 76 which slopes downwardly at an angle indicated at 78 which, in its preferred form, is also approximately 15°. The downwardly sloping surface 76 forms the lower wall of the annular orifice 37 as viewed in FIG. 5.

A downward angulation of 15° for the thin conically shaped sheet of air formed by the air knife fixture has proved to be highly desirable. The results for three different tests using an air knife fixture having a downward angulation of 15° for the thin conically shaped air sheet has been tabulated in Tables 1, 2 and 3.

Table 1

|  | Test Conditions | | |
|---|---|---|---|
|  | Air Pressure | Withdrawal Speed | Bake Temp. °F. | Bake Time Min. |
| Bottle No. 1 | 12 psi | .33 in./sec. | 460 | 7 |
| Bottle No. 2 | 14 psi | .33 in./sec. | 460 | 6.5 |
| Bottle No. 3 | 16 psi | .33 in./sec. | 460 | 6.5 |

Minimum clearance between bottle and air knife fixture approximately .5 inches.
Orifice height —5 mils Table 2

|  | Vertical Coating Distributions | | | | | |
|---|---|---|---|---|---|---|
|  | $N_1$ | $N_2$ | $N_3$ | $SW_1$ | $SW_2$ | $SW_3$ |
| Bottle No. 1 | — | 4.5 | 5 | 3 | 3 | 4.5 |
| Bottle No. 2 | 2.5 | 3.5 | 2.75 | 2.5 | 2.5 | 2.5 |
| Bottle No. 3 | 3 | 3 | 2.25 | 2 | 2 | 3.25 |

Table 3

|  | Horizontal Coating Distribution at $SW_2$ | | | | | |
|---|---|---|---|---|---|---|
|  | $P_1$ | $P_2$ | $P_3$ | $P_4$ | $P_5$ | $P_6$ |
| Bottle No. 1 | 3 | 3.5 | 3.25 | 3 | 3.75 | 3.5 |
| Bottle No. 2 | 2.5 | 2.5 | 3 | 3 | 2.75 | 2.5 |
| Bottle No. 3 | 2 | 2.5 | 3 | 2.5 | 2 | 2 |

As is apparent from Table 2, the vertical coating distribution of cured plastisol on three different bottles is substantially uniform for all of the positions measured. The measuring points $N_1$, $N_2$, $N_3$, $SW_1$, $SW_2$ and $SW_3$ are indicated generally in FIG. 1. Table 3 shows that the horizontal distribution around the midpoint of the side wall of the bottle, that is, at position $SW_2$, is also substantially uniform at all points around the bottle.

The results tabulated in Tables 1, 2 and 3 show that a downward angulation of 15° for the conically shaped air sheet provides a desirable cutting action wherein the excess plastisol is sheared or stripped from the surface of the bottle leaving a substantially uniform coating on the surface of the bottle. By way of comparison, if no air knife is employed, the coating thickness varies from 3½ mils at the neck to 15 mils at the heel. Other tests were performed where the air jet formed by the air knife fixture was not downwardly angulated at all, that is, the air was directed towards the bottle in a direction substantially perpendicular to the direction of bottle movement through the air knife fixture while that configuration effected some plastisol removal, the distribution of plastisol on the exterior surface of the bottle after curing was highly irregular and, indeed, there appeared to be a bulge of plastisol material located near the upper portion of the bottle side wall. Other experiments were conducted with downward angulation of 45° for the conically shaped air sheet. The results for this particular test indicated no perceptible cutting action at all. When the air knife had a downward angulation of approximately 30° the cutting action, while improved over a 45° angle, was not as satisfactory as the 15° angle.

While the foregoing results suggest that downward angulation of approximately 15° is near optimum for the particular coating and parameters involved, it will be recognized by those skilled in the art that there are a number of variables which will effect the end result. For example, the air pressure in the air knife will effect the thickness of material remaining on a bottle after it has passed through the fixture of this invention. Additionally, the rate of bottle travel as it passes through the air knife fixture will also affect the coating thickness. A further variable is the particular shape of the article being coated as well as the minimum clearance between that article and the air knife fixture. Further, the viscosity of the coating material prior to curing also has an effect on the thickness of the material remaining on the article. Therefore, in view of the large number of variables, the actual test results shown in Table 1, 2 and 3 suggest that the downward angulation of 15° for the conically shaped air sheet is advantageous but is by no means assuredly optimum for all cases. Indeed, it is reasonably clear from the tests performed to date that the optimum downward angulation for the conically shaped air sheet be greater than 0° and less than 45° and that the exact optimum angle depends on each of the variables indicated above. As such, once each of the variables has been set, a certain amount of experimentation may be necessary to determine the most optimum downward angulation for that particular configuration, which can be done by comparison of uniformity of coating thickness.

As indicated generally above, there are advantages to introducing the air into the plenum chamber 74 in a direction which is substantially perpendicular to the plane of the plenum chamber 74. Experimentation has shown, for example, that if the air is introduced into the plenum chamber 74 in a direction which is substantially parallel to the plane of the plenum chamber 74, the air flow through the orifice 37 is not uniform around the plenum and this lack of uniformity gives rise to an uneven distribution of coating material on the surface of the bottle. By introducing the air into the plenum chamber perpendicularly in the manner described above, advantageous results are achieved as indicated in Tables 1, 2 and 3. It will be clear to those skilled in the art that the pressurized air supply can also be introduced perpendicularly into the plenum chamber 74 at more than two locations. In this matter, the air pressure within the plenum chamber 74 is substantially uniform thereby assuring that the flow of air through the orifice 37 is also uniform.

The air knife provides a surprising advantage in respect to coating of the dome 21 of the bottom of the bottle. When the bottle is dipped into the plastisol bath, an air bubble or pocket is usually caught in the dome which prevents that part of the bottle surface from being contacted and uniformly wetted with coating material. If left to drain in the conventional manner, this area would be poorly coated.

However, when the bottle is passed through the air knife, the coating is spread around the heel 18 and over the dome area 21, even though that area may previously have been incompletely wetted by the bath. The air knife thus distributes the coating onto a bottom area which otherwise would not have been coated properly.

The foregoing description has specifically referred to coating of a bottle, for purposes of explanation, but the technique and apparatus of the invention are also useful in coating jars, and the term container is used generically herein and refers to and means both bottles (i.e., narrow neck items) and jars (wide mouth items).

While the foregoing description has been made with particular emphasis on a preferred embodiment, it will be clear to those skilled in the art that certain modifications in form only can be readily made without departing from the spirit and scope of this invention as defined in the following claims.

What is claimed is:

1. A method for coating a glass container with a sidewall coating of uniformly thick plastic material comprising the steps of:
   1. gripping said glass container by the finish portion thereof and dipping it into a bath containing a curable liquid coating material;
   2. forming an air knife in the shape of a downwardly angulated thin conical sheet of air flowing toward an apex;
   3. withdrawing said container from said bath with excess coating material adhering to it,
   4. passing said container with the adherent coating material thereon upwardly through said air knife along a path passing substantially through said apex while the knife strips excess coating material off the sidewall of said container, while said container is substantially upright with its longitudinal axis substantially parallel to the central axis of said conical sheet of air of said air knife,
   5. and curing the coating material remaining on said container.

2. The method of coating in claim 1 wherein the forming step includes forming a thin conical sheet of air downwardly angulated at an angle less than 45° with respect to horizontal.

3. The method of coating in claim 1 wherein the forming step includes forming a thin conical sheet of air downwardly angulated at an angle of approximately 15° with respect to horizontal.

4. The method of coating in claim 1 wherein the container has a domed base,
   said domed base is unevenly wetted by said coating material when said container is dipped base first into said bath,
   and said air knife distributes coating material over said domed base to cover the same.

* * * * *